(12) United States Patent
Rosen (10) Patent No.: US 9,545,975 B2
(45) Date of Patent: Jan. 17, 2017

(54) BICYCLE FRAME AND METHOD OF CONVERTING TO ELECTRONIC SHIFTING SYSTEM

(71) Applicant: David Rosen, Beaverton, OR (US)

(72) Inventor: David Rosen, Beaverton, OR (US)

( * ) Notice: Subject to any disclaimer, the term of this patent is extended or adjusted under 35 U.S.C. 154(b) by 0 days.

(21) Appl. No.: 14/623,355

(22) Filed: Feb. 16, 2015

(65) Prior Publication Data

US 2016/0236751 A1 Aug. 18, 2016

(51) Int. Cl.
*B62M 25/08* (2006.01)
*F16L 3/12* (2006.01)
*B62M 25/04* (2006.01)

(52) U.S. Cl.
CPC ............ *B62M 25/08* (2013.01); *F16L 3/1218* (2013.01); *B62M 25/04* (2013.01); *Y10T 74/20462* (2015.01)

(58) Field of Classification Search
CPC .. B60T 11/046; B62K 23/00; Y10T 74/20462; B62J 2099/0046
See application file for complete search history.

(56) References Cited

U.S. PATENT DOCUMENTS

| | | | | |
|---|---|---|---|---|
| 7,114,738 B1 * | 10/2006 | Chen | ...................... | B62K 19/00 280/281.1 |
| 8,662,519 B2 * | 3/2014 | Domahidy | ............ | B60T 11/046 280/288.3 |
| 2012/0247263 A1 * | 10/2012 | Chubbuck | ................ | B62J 99/00 74/502.6 |

OTHER PUBLICATIONS

PDF of https://web.archive.org/web/20120203013115/http://zinncycles.wordpress.com/2011/11/19/zinn-titanium-road-bike-with-shimano-di2, "Zinn Titanium road bike with Shimano Di2," blog post by Zinn Cyles, 3 pp., posted on Nov. 19, 2011, archived on Feb. 3, 2012.
PDF of http://www.fyxation.com/blogs/fyxation-1/8291782-quiver-frameset-removable-cable-stops, "Quiver Frame Set: Removable Cable Stops," blog post by Fyxation Bicycle Company, 4 pages, posted on May 24, 2013.
PDF of http://www.bicycleretailer.com/new-products/2012/09/12/one-frame-quiver#.WDW8_9UrKpo, "One Frame is a Quiver," article by Bicycle Retailer and Industry News, 4 pages, published Sep. 12, 2012.

* cited by examiner

*Primary Examiner* — Kevin Hurley
(74) *Attorney, Agent, or Firm* — Klarquist Sparkman, LLP (57) ABSTRACT

The present disclosure relates to devices and methods of converting a bicycle frame from a mechanical gear-shifting configuration to an electronic gear-shifting configuration and vice versa. In a representative embodiment, a method of converting a bicycle frame from a mechanical gear-shifting configuration to an electronic gear-shifting configuration comprises removing a mechanical cable extending between a mechanical gear-shift actuator and a mechanical gear shifter via a cable stop of a removable bracket member secured to a down tube member of the bicycle frame, and removing the removable bracket member from the down tube member of the bicycle frame. The method further comprises mounting an electronically-actuated gear shifter to the bicycle frame in electrical communication with an electronic gear-shift actuator such that actuation of the electronic gear-shift actuator causes the electronically-actuated gear shifter to shift gears.

20 Claims, 5 Drawing Sheets

BICYCLE FRAME AND METHOD OF CONVERTING TO ELECTRONIC SHIFTING SYSTEM

FIELD

This disclosure relates to bicycle frames and, more particularly, to bicycle frames that can be converted between a mechanical gear-shifting configuration and an electronic gear-shifting configuration.

BACKGROUND

Generally, bicycle frames are designed to be set up with either an electronic gear-shifting system, in which an electronic signal generated by an electronic gear-shift actuator is transmitted to an electronic gear shifter to effect gear changes, or a mechanical gear-shifting system, in which force is transmitted from a mechanical gear-shift actuator to a mechanical gear shifter by a traditional Bowden cable to effect gear changes. Electronic gear-shifting systems can be preferable, for example, in bicycle racing, in which increased responsiveness and fast gear changes are advantageous. Conversely, mechanical gear-shifting systems can be preferable, for example, when riding for long periods of time during which a battery for an electronic gear-shifting system cannot be easily replaced or recharged, or when riding in a location where service and/or replacement parts for sophisticated electronic gear-shifting systems are not available in the event of a component failure. However, bicycle frames designed to accept an electronic gear-shifting system cannot be easily converted to a mechanical gear-shifting system, and vice versa. Accordingly, improvements to bicycle frames are desirable.

SUMMARY

Certain embodiments of the disclosure concern devices and methods for converting a bicycle frame from a mechanical gear-shifting configuration to an electronic gear-shifting configuration. In a representative embodiment, a method of converting a bicycle frame from a mechanical gear-shifting configuration to an electronic gear-shifting configuration comprises removing a mechanical cable extending between a mechanical gear-shift actuator and a mechanical gear shifter via a cable stop of a removable bracket member secured to a down tube member of the bicycle frame, and removing the removable bracket member from the down tube member of the bicycle frame. The method further comprises mounting an electronically-actuated gear shifter to the bicycle frame in electrical communication with an electronic gear-shift actuator such that actuation of the electronic gear-shift actuator causes the electronically-actuated gear shifter to shift gears.

In another representative embodiment, an assembly comprises a bicycle frame including a down tube member defining an opening therein, a threaded sleeve received in the opening of the down tube member, and a mechanical gear-shift actuator coupled to the frame. The assembly further comprises a mechanically-actuated gear shifter coupled to the frame, and a removable bracket member including an arcuate main portion defining an opening and including at least one cable stop. The removable bracket member is secured to the down tube member by a fastener extending through the opening defined in the main portion of the removable bracket member and into the threaded sleeve in the down tube member. The assembly further comprises a mechanical cable extending between the mechanical gear-shift actuator and the mechanically-actuated gear shifter via the cable stop of the removable bracket member.

In another representative embodiment, a kit for converting a bicycle frame between a mechanical gear-shifting configuration and an electronic gear-shifting configuration comprises a removable bracket member securable to a down tube member of the bicycle frame. The removable bracket member includes at least one cable stop to receive a mechanical cable for actuating a mechanically-actuated gear shifter. The kit further comprises a wire guide member securable adjacent a rear dropout of the bicycle frame and including an upper portion and a lower portion. The lower portion is configured to guide an electronic wire from the rear dropout to an electronically-actuated gear shifter.

The foregoing and other objects, features, and advantages of the invention will become more apparent from the following detailed description, which proceeds with reference to the accompanying figures.

DETAILED DESCRIPTION

Figure 1:
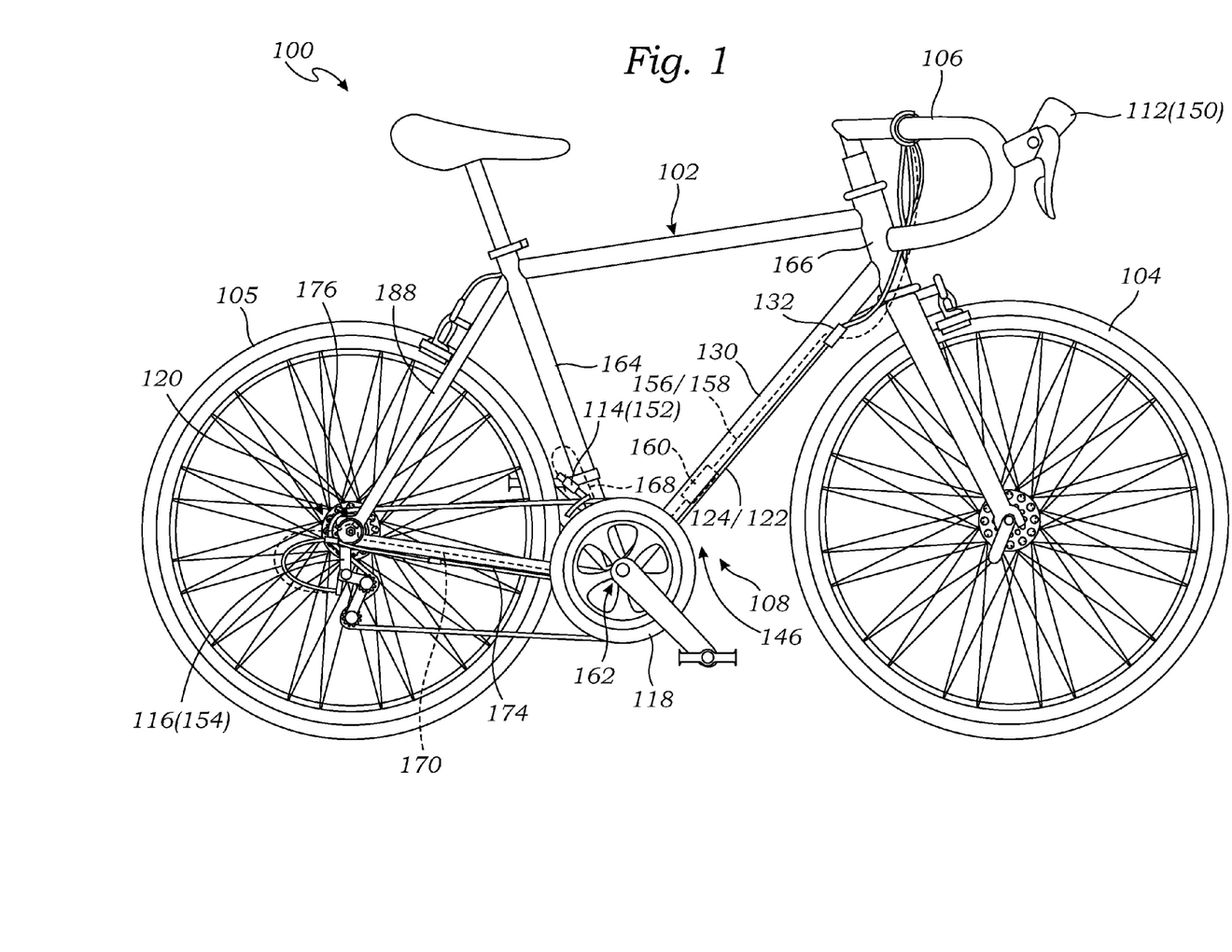
FIG. 1 illustrates a bicycle including a bicycle frame convertible between a mechanical gear-shifting configuration and an electronic gear-shifting configuration, according to one embodiment.
Figure 2:
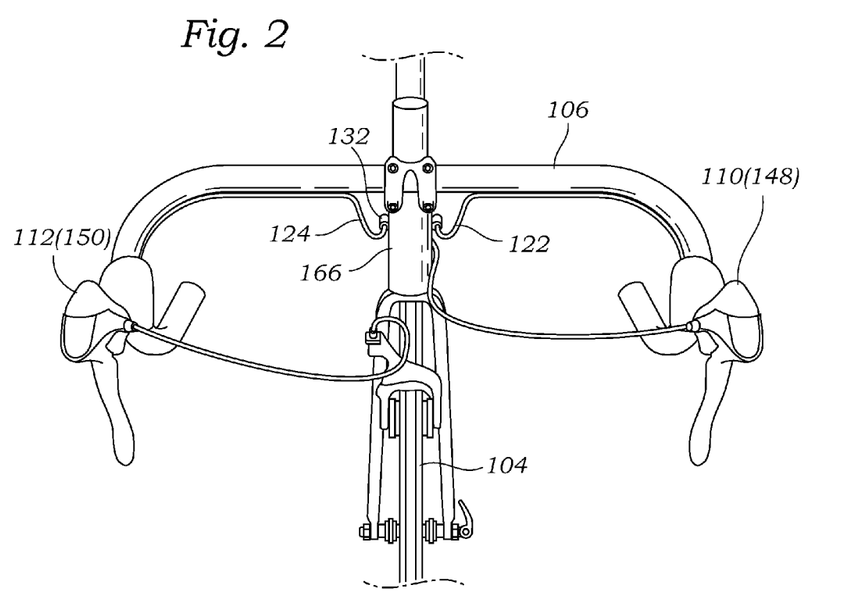
FIG. 2 illustrates a perspective view of a front end of the bicycle of FIG. 1.

FIGS. 1 and 2 illustrate an exemplary bicycle 100 including a frame 102, wheels 104, 105, and drop-style handlebars 106, as are commonly used with road or cyclocross style bicycles. It will be understood that the components of the system described herein can be mounted in any suitable arrangement, and that the controls are preferably mounted on the handlebar, or anywhere that they can be reached by a user. In the illustrated embodiment, the bicycle 100 can comprise a mechanical gear-shifting system 108 including a pair of mechanical gear-shift actuators 110, 112 mounted to the handlebar 106 (see FIG. 2). In the illustrated embodiment, the gear-shift actuators 110, 112 are shown configured as integrated brake/shift levers, but can be configured as bar-end shifters, down tube shifters, etc., as desired. The mechanical gear-shift actuators can be coupled to respective front and rear mechanical gear shifters 114, 116 associated with front and rear sprockets 118, 120, respectively.

Mechanical cable assemblies including internal cables 122, 124 disposed in respective housings 126, 128 can extend between the gear-shift actuators 110, 112 and the respective front and rear gear shifters 114, 116. The cables 122, 124 can transmit motion of the gear-shift actuators 110, 112 caused by actuation of the gear shift actuators by a user to the gear shifters 114, 116 to effect gear shift events. As used herein, the terms "mechanical cable," "Bowden cable," and "cable" refer to a metal inner cable at least partially contained in a housing and configured to transmit force along the cable from one component to another coupled at opposite ends of the cable (e.g., from a mechanical gear-shift actuator to a mechanically-actuated gear shifter to effect gear changes).

Figure 3:
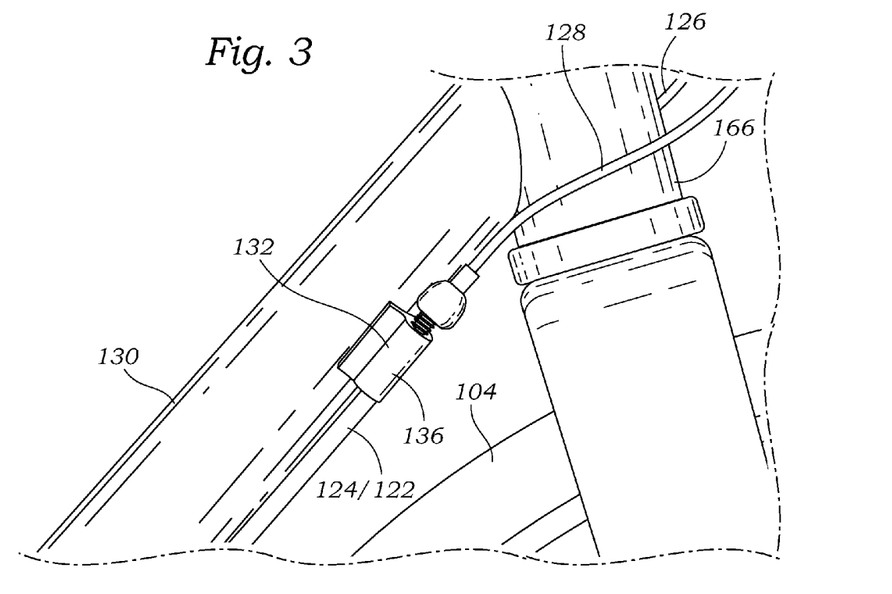
FIG. 3 illustrates a representative embodiment of a removable bracket member secured to a down tube member of the bicycle frame of FIG. 1.
Figure 4:
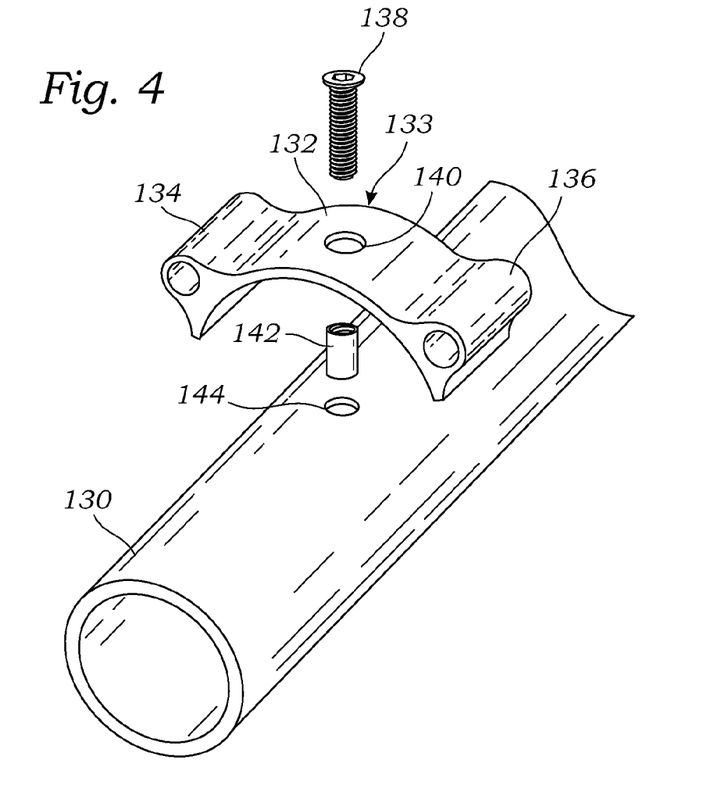
FIG. 4 illustrates an exploded view of a fastener and threaded sleeve for securing a removable bracket member to a tube member of a bicycle frame.

The mechanical cables 122, 124 can extend along the exterior of the frame 102 from the gear-shift actuators 110, 112 to the respective gear shifters 114, 116 configured as front and rear derailleurs. More specifically, the cables 122, 124 can extend along a down tube member 130 of the frame via a removable bracket member 132 including an arcuate main portion 133 and two integrally formed cable stops 134, 136 (see, e.g., FIGS. 3 and 4). The cable stops 134, 136 can be configured to receive respective end portions of the cable housings 126, 128, as best shown in FIGS. 3 and 4. As used herein, the term "cable stop" refers to a structure configured to receive an end of a mechanical cable housing such that when actuated, the inner cable can move freely through the housing (and the cable stop) while movement of the housing is restrained by the cable stop. However, in alternative embodiments, the removable bracket member 132 can include any suitable number of cable stops, such as a single cable stop for configurations in which the bicycle frame includes only a front or rear derailleur. In further alternative embodiments, the cable stops 134, 136 can be separately formed and secured to the removable bracket member.

The bracket member 132 can be securable to the frame 102 by, for example, a threaded fastener 138 insertable through an opening 140 defined in the bracket member 132 into a threaded sleeve 142 configured as a rivet nut, as shown in FIG. 4. Threaded sleeve 142, in turn, can be received in a pre-formed opening 144 in the down tube member 130 of the frame 102. In the illustrated embodiment, the removable bracket member 132 can be secured to the underside of the down tube member 130 such that the cables, housings, and cable stops are disposed on the underside of the down tube member 130 and out of the way of a user's legs. However, in alternative embodiments, the removable bracket member 132 can be disposed anywhere on the circumference of the down tube member 130, as desired. In further alternative embodiments, the opening 144 in the down tube member 130 can be threaded to receive the fastener 138.

The main portion 133 of the removable bracket member 132 can have a diameter that is smaller than the diameter of the down tube member 130 such that the ends of the removable bracket member 132 deform radially outwardly when placed on the down tube member 130 to aid in retaining it on the down tube. The removable bracket member 132 can be made from a variety of materials, including any of various metals, plastics, or reinforced fibers, such as carbon fiber. In some embodiments, the main portion 133 and the cable stops 134, 136 can comprise the same material, or different materials, as desired. In alternative embodiments, the removable bracket member 132 can be secured to the down tube member 130 with more than one fastener, such as with one fastener at each end of the removable bracket member, or by any other suitable fixation method. In some embodiments, movement of the removable bracket member 132 can be restrained by one or more ridges and/or recesses defined by the down tube member 130 in which the removable bracket member 132 can be disposed.

Various methods by which the bicycle frame 102 may be set up in a mechanical gear-shifting configuration or an electronic gear-shifting configuration, and converted from one to the other will now be described. To set up the bicycle frame 102 in a mechanical gear-shifting configuration, the removable bracket member 132 can be secured to the down tube member 130 of the frame 102, and the mechanical gear-shift actuators 110, 112 and mechanically-actuated gear shifters 114, 116, of the mechanical gear shifting system 108 can be secured to the handle bars and the frame, respectively. The ends of the cables 122, 124 can then be secured to the respective gear-shift actuators 110, 112 and gear shifters 114, 116, and the cables 122, 124 can be positioned such that the housings 126, 128 are received in the respective cable stops 134, 136 of the removable bracket member 132. The cables can then be tensioned appropriately.

To set up the bicycle frame 102 in an electronic gear-shifting configuration, an electronic gear-shifting system 146 including electronic gear-shift actuators 148, 150 in electrical communication with electronically-actuated gear shifters 152, 154 via a combined battery and control unit 160 can be secured to the frame, as shown in FIGS. 1 and 2. Example electronic gear-shifting systems include the Dial) electronic shifting system available from Shimano, Inc., or the EPS—Electronic Power Shift® electronic shifting system available from Campagnolo, S.R.L.

Figure 7:
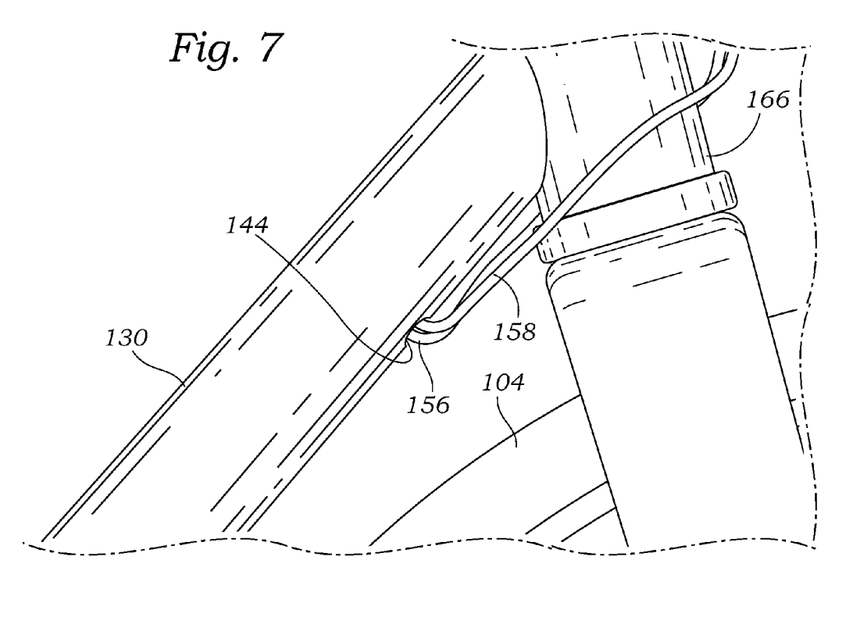
FIG. 7 illustrates the electrical wires of an electronic gear-shifting system entering an opening in the down tube member of the bicycle frame of FIG. 1.

As illustrated in FIGS. 1 and 2, electrical wires 156, 158 (indicated in phantom) can extend from the electronic gear-shift actuators 148, 150 along the down tube member 130, and can enter the down tube member 130 through the opening 140 (see also FIG. 7). The electrical wires 156, 158 can be configured to transmit electronic shift signals from the electronic gear-shift actuators 148, 150 to the electronically-actuated gear shifters 152, 154 via the control unit 160 to effect gear changes. In the illustrated embodiment, the wires 156, 158 extend inside the down tube member 130 to the control unit 160, which is shown located inside the down tube member near the bottom bracket housing 162. It should be understood, however, that the control unit 160 can be mounted at any suitable location on or inside the frame 102, such as on or inside the down tube member 130, on or inside the seat tube or member 164, on the handlebars 106, etc. Additionally, in alternative embodiments the wires 156, 158 can enter the frame at any suitable location, such as through the head tube 166, as desired.

Figure 6:
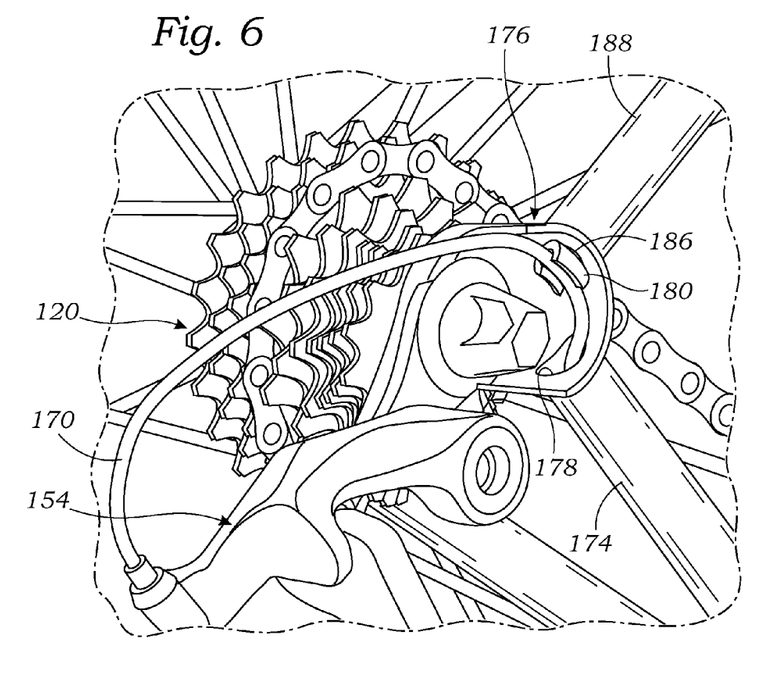
FIG. 6 illustrates a perspective view of a rear dropout of the bicycle frame of FIG. 1.

Electrical wires 168, 170 corresponding to the wires 156, 158 can extend from the control unit 160 to the respective front and rear electronically-actuated gear shifters 152, 154. In the illustrated embodiment, the wires 168, 170 can extend from the down tube member 130 into the bottom bracket housing 162. The wire 168 can then extend into the seat tube member 164 and emerge through a pre-formed opening (not shown) in the seat tube, whereby it can be coupled to the electronically-actuated gear shifter 152 associated with the front sprocket 118. Meanwhile, the wire 170 can extend from the bottom bracket housing 162 through a chain stay tube member 174, and can emerge adjacent a rear dropout 176 of the frame from an opening 178 defined in the end of the chain stay tube member 174, as shown in FIG. 6. As used herein, the term "rear dropout" refers to a member coupled at the convergence of a seat stay tube member and a chain stay tube member of a bicycle frame that is configured to receive an axle of a wheel hub. A typical bicycle frame includes two rear dropouts laterally spaced apart from one another at the rear of the bicycle frame and configured to receive respective ends of an axle of a wheel hub.

Figure 5:
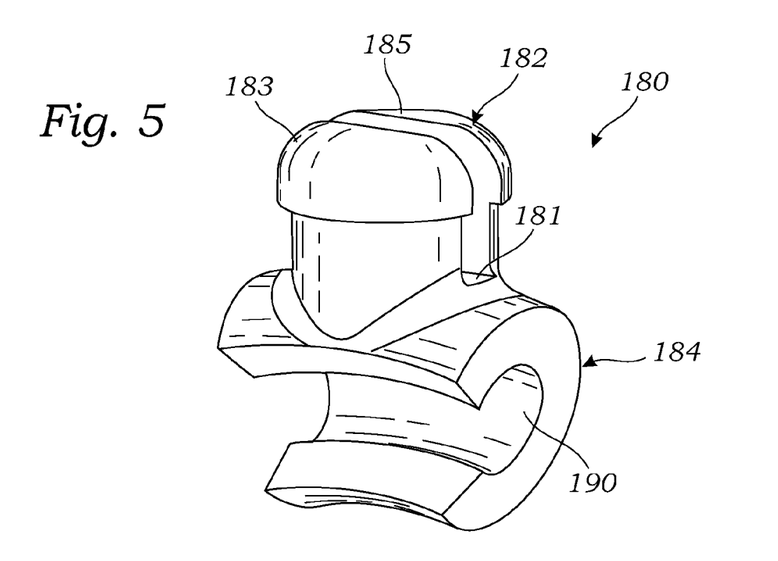
FIG. 5 illustrates a representative embodiment of a wire guide member.

The wire 170 can be retained in and guided along a contour of the rear dropout 176 to the electronically-actuated gear shifter 154 by a wire guide member 180. Referring to FIG. 5, the wire guide member 180 can include an upper portion 182 and a lower portion 184, and the upper portion 182 can be received in an opening 186 defined in a seat stay tube member 188 of the bicycle frame (see FIG. 6). In the illustrated embodiment, the upper portion 182 can have a diameter that is larger than a diameter of the opening 186, and can define a recess or channel 181 such that the upper portion 182 is divided into two spaced-apart projections 183, 185. In this manner, the projections 183, 185 can be forced toward one another or "pinched" together when inserted into the opening 186 of the seat stay tube member 188 to aid in retaining the wire guide member 180 in the seat stay tube. The lower portion 184 can define an arcuate channel or recess 190 to receive the wire 170 and guide the wire around the rear dropout 176 to the electronically actuated gear shifter 154 such that the wire does not become entangled with the axle or spokes of the wheel 104. In this regard, the wire guide member 180 can be advantageous because the wire 170 is especially prone to snagging or entangling in the area adjacent the rear dropout 176 where the wire 170 emerges from the chain stay tube member 174. In particular embodiments, the wire guide member 180 can comprise, for example, any of various metals, plastics, or reinforced fibers, such as carbon fiber.

To convert the bicycle frame 102 from a mechanical gear-shifting configuration to an electronic gear-shifting configuration, the mechanical gear-shift actuators, cables, and mechanically-actuated gear shifters of the mechanical gear shifting system 108 can be removed from the frame. The removable bracket member 132 and associated hardware can then be removed from the down tube member 130. The electronic gear-shift actuators 148, 150 and electronically-actuated gear shifters 152, 154 can then be secured to the handlebars 106 and frame 102, respectively. The control unit 160 can be positioned inside the down tube member 130, and the wires 156, 158 can be inserted into the down tube through the opening 144 such that they extend between the control unit 160 and the electronic gear-shift actuators 148, 150. The wire 168 can be routed from the control unit 160, through the seat tube member 164, and through an opening in the seat tube member, where it can be coupled to the electronically-actuated gear shifter 152.

The wire guide member 180 can be positioned adjacent the rear dropout 176 by inserting the upper portion 182 into the opening 186 of the seat stay tube 188. The wire 170 can be positioned such that it extends from the control unit 160 around the inside diameter of the bottom bracket housing 162, through the chain stay tube member 174, and emerges from the opening 178. The wire 170 can be situated in the arcuate recess 190 of the wire guide member 180 such that the wire substantially follows the contour of the rear dropout 176 and is coupled to the electronically-actuated gear shifter 154. In alternative embodiments, the wire guide member 180 can be received in the opening 178 of the chain stay tube member 174, and can be configured to allow the electrical wire 170 to extend axially through the wire guide member to the electronically-actuated gear shifter 154. The bicycle frame can be converted from an electronic gear-shifting configuration to a mechanical gear-shifting configuration by reversing the above steps.

In some embodiments, the bicycle frame 102 can comprise any of various metals, including, for example, steel, stainless steel, titanium, and/or aluminum or aluminum alloys, any of various composite materials such as carbon fiber or blended titanium and carbon fiber, natural materials such as wood or bamboo, or any combination thereof. The bicycle frame configurations, devices, and methods described herein can be especially useful in combination with composite and/or metal frames, in which the requisite openings can be pre-formed when the frame is made. This can reduce the need to form openings in the tube members of a pre-existing frame, which can weaken the structural integrity of the frame. Additionally, it should be understood that the bicycle frame can be configured as a road bike style frame, a mountain bike style frame, a touring bike style frame, a cargo bike style frame, a cyclocross style frame, or any combination thereof.

In some embodiments, the bicycle frames and methods described herein can be used in combination with a wireless electronic shifting system in which the electronic gear-shift actuators and electronically-actuated gear shifters are not physically linked to one another by electrical wires, but are in electrical communication via one or more radio frequency transceivers associated with the respective electronic gear-shift actuators and the electronically-actuated gear shifters.

The bicycle frame embodiments and methods described herein can provide significant advantages over known bicycle frames. Known bicycle frames are often configured exclusively for use with either electronic gear-shifting systems or mechanical gear-shifting systems, and can only be converted from one to the other with extensive modification, if at all. For example, bicycle frames configured for use with mechanical gear-shifting systems often lack the openings in the frame tubes required for internal routing of electrical wires through portions of the frame, while frames configured for use with mechanical gear-shifting systems lack suitable mechanisms (e.g., cable stops) for securing mechanical cables and housing to the exterior of the frame. Thus, to enjoy the respective benefits of electronic and mechanical gear-shifting systems, a user must frequently have a bicycle frame dedicated to each configuration, at considerable expense.

The frame embodiments and methods described herein can allow a user to configure the same bicycle frame for use with either an electronic gear-shifting system or a mechanical gear-shifting system, and to convert between electronic and mechanical gear-shifting configurations at will. This can allow a user to ride the bicycle frame in an electronic gear-shifting configuration in, for example, bicycle racing applications, where the relatively faster gear change capabilities of an electronic gear-shifting system are advantageous. Alternatively, if the user wishes to ride the same bicycle frame, for example, on extended rides, where recharging or replacement of a battery for an electronic gear-shifting system is not practicable, or in areas where parts or service for sophisticated electronic shifting systems may not be available in the event of a component failure, the bicycle frame can be easily converted to a mechanical gear-shifting configuration.

In some embodiments, the removable bracket member 132, the wire guide member 180, and the associated hardware (e.g., fastener 138 and threaded sleeve 142) can be provided as a kit for retrofitting an existing bicycle frame such that it can be configured in a mechanical gear-shifting configuration and/or an electronic gear-shifting configuration. For example, openings can be created (e.g., by drilling) in the down tube, seat tube, and respective ends of the seat stay tube and the chain stay tube at the rear dropout of an existing bicycle frame, allowing the bicycle frame to be converted from a mechanical gear-shifting system to an electronic gear-shifting system using the components and methods described herein.

Figure 8:
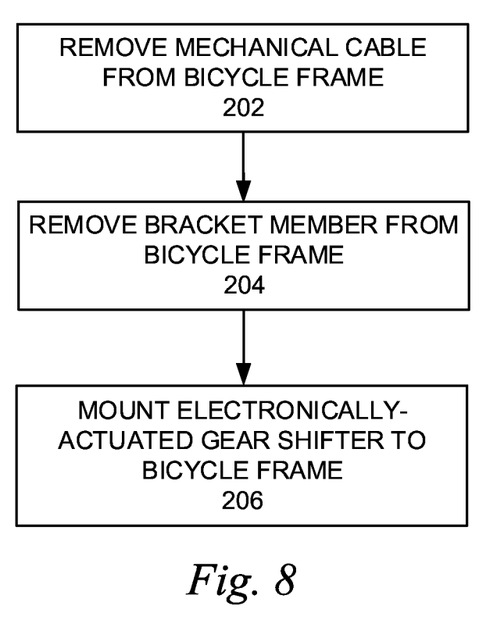
FIG. 8 is a schematic block diagram illustrating a representative method of converting a bicycle frame from a mechanical gear-shifting configuration to an electronic gear-shifting configuration.

FIG. 8 schematically illustrates a representative method of converting a bicycle frame from a mechanical gear-shifting configuration to an electronic gear-shifting configuration. At block 202, a mechanical cable extending between a mechanical gear-shift actuator and a mechanical gear shifter via a cable stop of a removable bracket member secured to a down tube member of the bicycle frame can be removed.

At block 204, the removable bracket member can be removed from the down tube member of the bicycle frame.

At block 206, an electronically-actuated gear shifter can be mounted to the bicycle frame in electrical communication with an electronic gear-shift actuator such that actuation of the electronic gear-shift actuator causes the electronically-actuated gear shifter to shift gears.

General Considerations

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

In the following description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

As used herein, the terms "integrally formed" and "unitary construction" refer to a construction that does not include any welds, fasteners, or other means for securing separately formed pieces of material to each other.

Unless otherwise stated, the term "bicycle frame" includes components such as handlebars, stem, front fork, etc., that are typically removably coupled to the bicycle frame and not welded to, or otherwise integrally formed with, the tube members of the bicycle frame.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

In view of the many possible embodiments to which the principles of the disclosure may be applied, it should be recognized that the illustrated embodiments are only preferred examples and should not be taken as limiting the scope of the disclosure. Rather, the scope of the disclosure is defined by the following claims.

What is claimed is:

1. A method of converting a bicycle frame from a mechanical gear-shifting configuration to an electronic gear-shifting configuration, comprising:
    removing a mechanical cable extending between a mechanical gear-shift actuator and a mechanical gear shifter via a cable stop of a removable bracket member secured to a down tube member of the bicycle frame, the down tube member defining an opening therein, and the removable bracket member being secured to the down tube member by a fastener extending through an opening defined in an arcuate main portion of the removable bracket member and into a threaded sleeve received in the opening of the down tube member;
    removing the removable bracket member from the down tube member of the bicycle frame; and
    mounting an electronically-actuated gear shifter to the bicycle frame in electrical communication with an electronic gear-shift actuator such that actuation of the electronic gear-shift actuator causes the electronically-actuated gear shifter to shift gears.

2. The method of claim 1, further comprising routing at least a portion of an electrical wire internally of the bicycle frame between the electronic gear-shift actuator and the electronically-actuated gear shifter.

3. The method of claim 2, wherein routing the electrical wire further comprises inserting the electrical wire into the down tube member of the bicycle frame through the opening that is configured to receive the fastener for securing the removable bracket member to the down tube member.

4. The method of claim 2, further comprising:
    securing a wire guide member adjacent a rear dropout of the bicycle frame; and
    securing the electronic wire to the wire guide member such that the electronic wire extends from the rear dropout to the electronically-actuated gear shifter.

5. The method of claim 4, wherein:
the wire guide member includes an upper portion and a lower portion comprising a recess for receiving the electrical wire; and
securing the wire guide member further comprises securing the upper portion of the wire guide member in an opening defined in a seat stay tube member of the bicycle frame.

6. The method of claim 1, wherein the electronically-actuated gear shifter and the electronic gear-shift actuator are in wireless electrical communication with one another.

7. The method of claim 1, further comprising:
removing the electronic wire, the wire guide member, the electronically-actuated gear shifter, and the electronic gear-shift actuator from the bicycle frame;
securing the removable bracket member to the down tube member of the bicycle frame; and
securing the mechanical cable to the bicycle frame such that the mechanical cable extends between the mechanical gear-shift actuator and the mechanical gear shifter via the cable stop of the removable bracket member.

8. The method of claim 1, wherein the removable bracket member includes two cable stops integrally formed with the main portion on opposite sides of the opening.

9. An assembly, comprising:
a bicycle frame including a down tube member defining an opening therein;
a threaded sleeve received in the opening of the down tube member;
a mechanical gear-shift actuator coupled to the frame;
a mechanically-actuated gear shifter coupled to the frame;
a removable bracket member including an arcuate main portion defining an opening and including at least one cable stop, the removable bracket member being secured to the down tube member by a fastener extending through the opening defined in the main portion of the removable bracket member and into the threaded sleeve in the down tube member; and
a mechanical cable extending between the mechanical gear-shift actuator and the mechanically-actuated gear shifter via the cable stop of the removable bracket member.

10. The assembly of claim 9, wherein the bicycle frame is configured as a road bike style frame or a mountain bike style frame.

11. The assembly of claim 9, wherein the bicycle frame comprises a material selected from steel, titanium, aluminum, carbon fiber, wood, bamboo, or any combination thereof.

12. The assembly of claim 9, wherein the removable bracket member includes two cable stops integrally formed with the main portion on opposite sides of the opening.

13. A bicycle including wheels and handlebars coupled to the frame of the assembly of claim 9.

14. The assembly of claim 9, wherein the main portion of the removable bracket member has a diameter that is less than a diameter of the down tube member.

15. The assembly of claim 9, wherein the removable bracket member is secured to an underside of the down tube member.

16. The assembly of claim 9, wherein the at least one cable stop includes a tubular portion coupled to the main portion of the removable bracket member.

17. An assembly, comprising:
a bicycle frame including a down tube member defining an opening therein, and a seat stay tube member;
an electronic gear-shift actuator coupled to the frame;
an electronically-actuated gear shifter coupled to the frame;
an electronic wire extending between the electronic gear-shift actuator and the electronically-actuated gear shifter via the opening in the down tube member such that at least a portion of the electronic wire extends internally of the frame; and
a removable wire guide member including an upper portion positioned in an opening defined in an end of the seat stay tube member adjacent a rear dropout of the bicycle frame, and a lower portion configured to receive the electronic wire such that the electronic wire extends from the rear dropout and is coupled to the electronically-actuated gear shifter.

18. A bicycle including wheels and handlebars coupled to the frame of the assembly of claim 17.

19. The assembly of claim 17, wherein the lower portion of the wire guide member includes an arcuate recess configured to receive the electronic wire.

20. The assembly of claim 17, wherein the upper portion of the wire guide member defines a recess or channel such that the upper portion includes two spaced-apart projections deformable toward one another when inserted into an opening in the seat stay tube member of the bicycle frame.

* * * * *